C. B. JUGLE.
AUTOMOBILE FENDER.
APPLICATION FILED NOV. 22, 1915.
1,192,641.
Patented July 25, 1916.
3 SHEETS—SHEET 1.
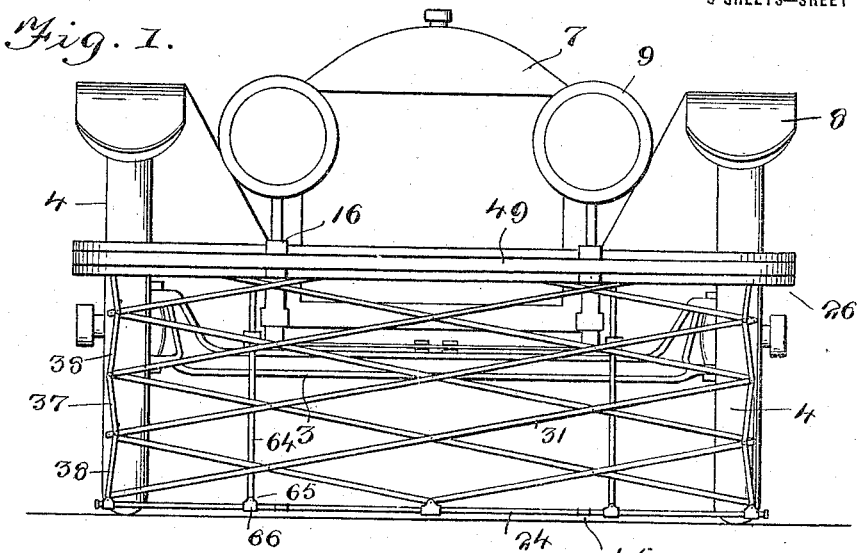
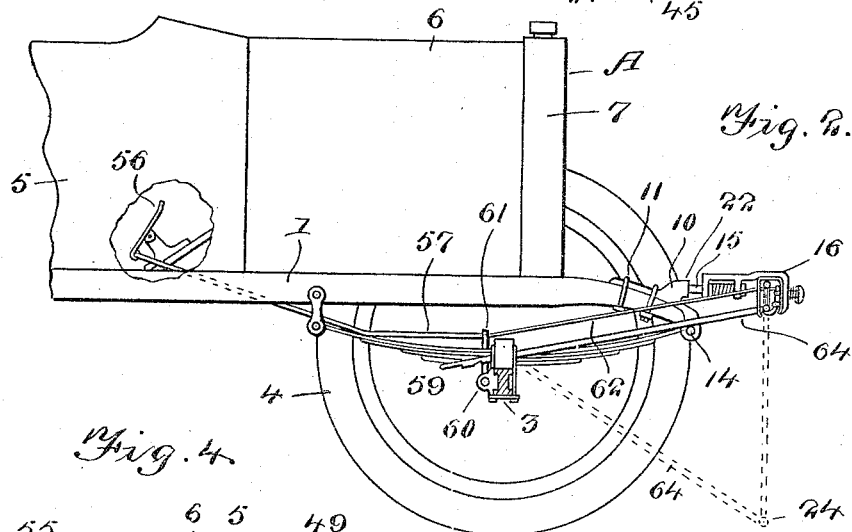
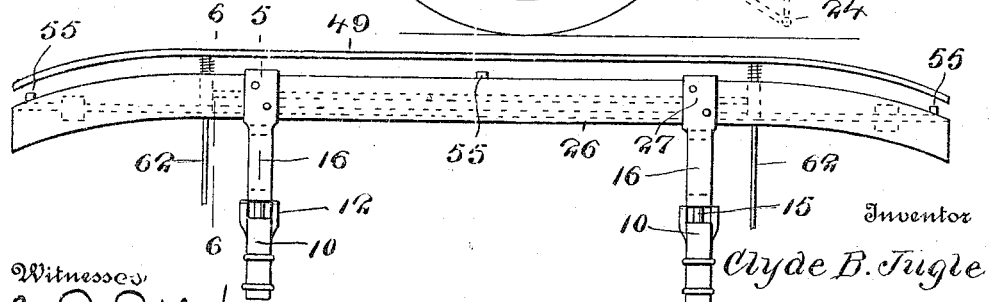
Witnesses
E. P. Ruppert
P. M. Smith
Inventor
Clyde B. Jugle
By Victor J. Evans
Attorney C. B. JUGLE.
AUTOMOBILE FENDER.
APPLICATION FILED NOV. 22, 1915.
1,192,641.
Patented July 25, 1916.
3 SHEETS—SHEET 2.
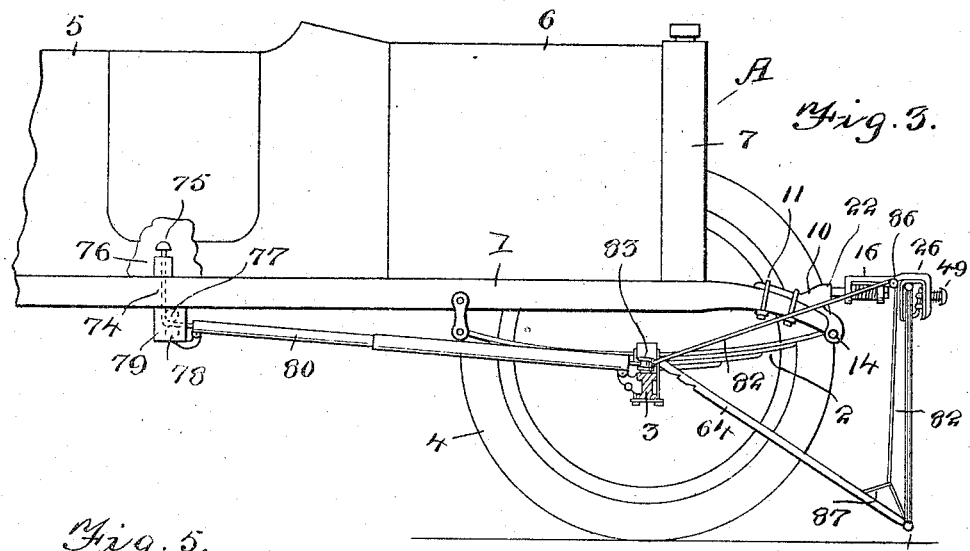
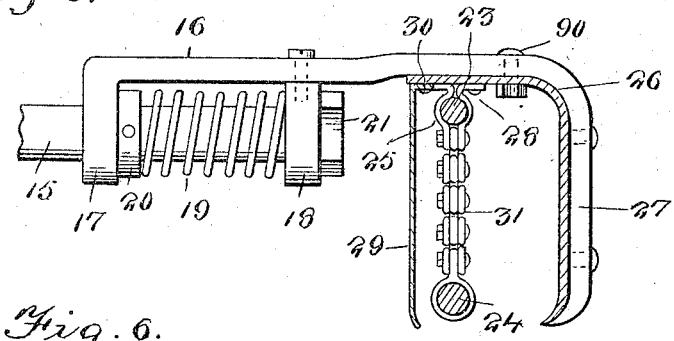
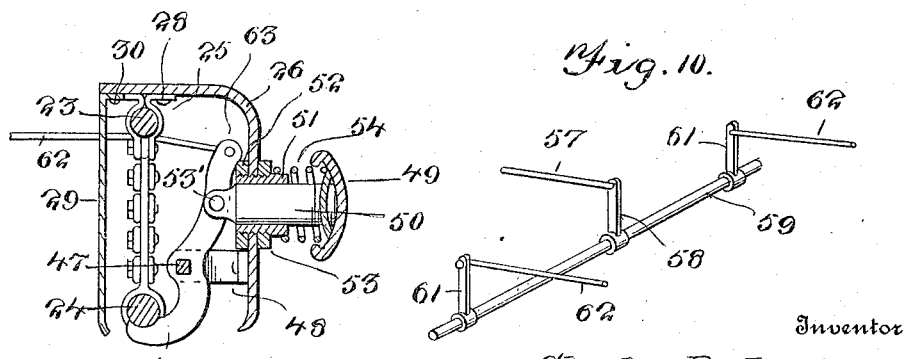
Inventor
Clyde B. Jugle
By Victor J. Evans
Attorney
Witnesses
E. P. Ruppert
P. M. Smith C. B. JUGLE.
AUTOMOBILE FENDER.
APPLICATION FILED NOV. 22, 1915.
1,192,641.
Patented July 25, 1916.
3 SHEETS—SHEET 3.
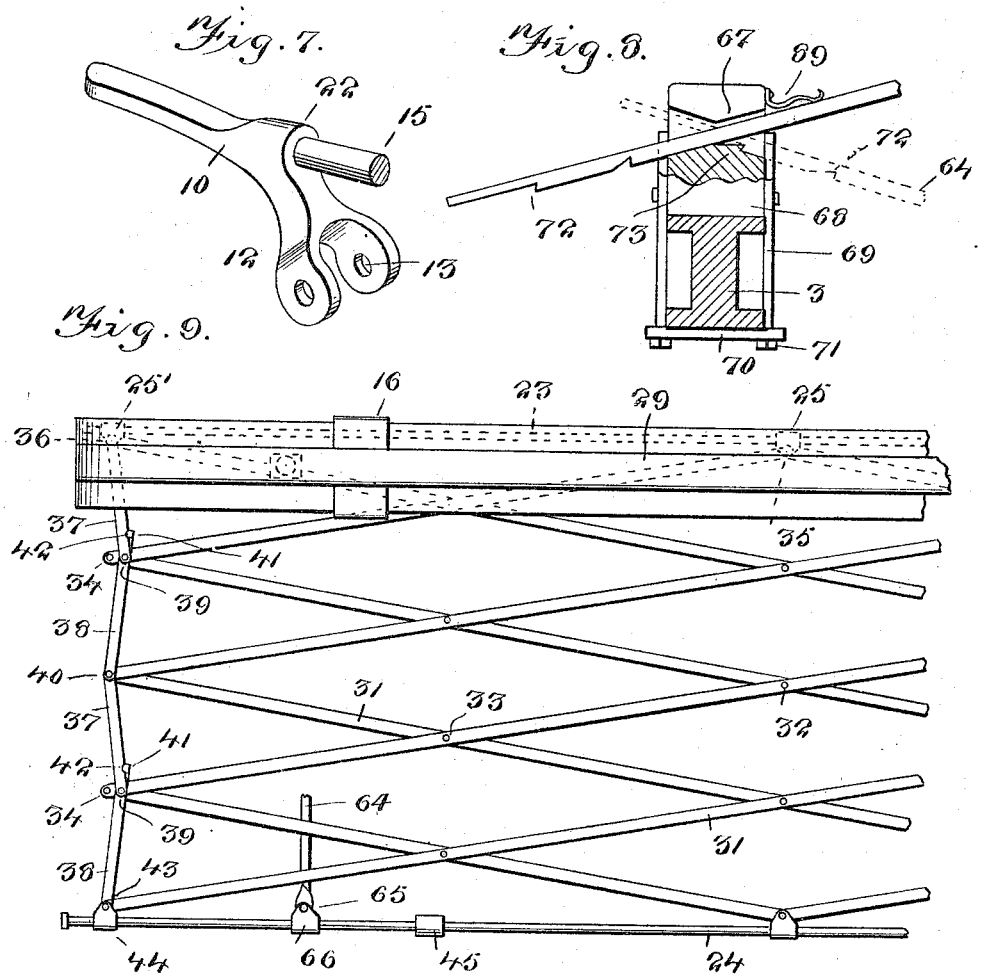
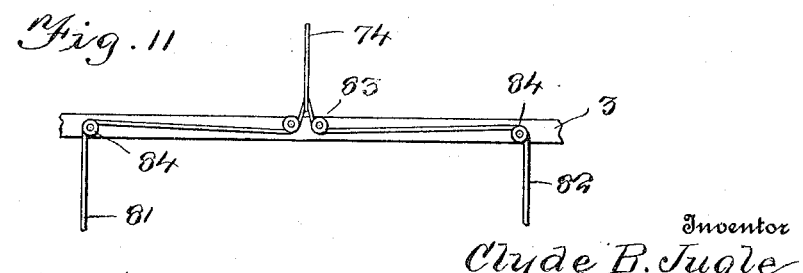
Inventor
Clyde B. Jugle
Witnesses
By Victor J. Evans
Attorney

UNITED STATES PATENT OFFICE.

CLYDE B. JUGLE, OF JAMESTOWN, NEW YORK.

AUTOMOBILE-FENDER.

1,192,641. Specification of Letters Patent. Patented July 25, 1916.

Application filed November 22, 1915. Serial No. 62,881.

*To all whom it may concern:*

Be it known that I, CLYDE B. JUGLE, a citizen of the United States, residing at Jamestown, in the county of Chautauqua and State of New York, have invented new and useful Improvements in Automobile-Fenders, of which the following is a specification.

This invention relates to fenders especially designed for use on automobiles at the front thereof, the object in view being to produce a fender of attractive appearance which will prevent persons struck by the vehicle from being injured by coming in contact with the wheels, mud guards, front axle, radiator and other parts of the machine, the fender being collapsible and the body of the fender being normally concealed in a housing and being of the collapsible and extensible type, combined with means for automatically tripping the fender, bracing the same in its operative or useful position, and also means for folding the fender and restoring the same to its housed position, the last named means being under the control of the driver while in his seat.

A further object of the invention is to provide a combined bumper and fender having the characteristics and capabilities above referred to combined with means whereby it may be either automatically tripped by the person or object coming in contact therewith or by the operator in his seat.

A further object in view is to produce a fender the construction of which is of such a character that it may be easily repaired and kept in perfect working condition.

With the above and other objects in view, the invention consists in the novel construction, combination and arrangement of parts, as herein described, illustrated and claimed.

In the accompanying drawings:—Figure 1 is a front elevation showing the fender of this invention applied to an automobile. Fig. 2 is a view partly in elevation and partly in vertical longitudinal section showing the fender in its raised position in full lines and in its operating or tripped position in dotted lines and particularly showing the means for tripping the fender to permit the same to drop. Fig. 3 is a similar view taken on a different line and showing particularly the means for restoring the fender to its raised or inoperative position. Fig. 4 is a plan view of the fender detached but showing the attaching or supporting members. Fig. 5 is an enlarged vertical longitudinal section on the line 5—5 of Fig. 4. Fig. 6 is an enlarged vertical section on the line 6—6 of Fig. 4. Fig. 7 is a detail perspective view of one of the supporting members or brackets. Fig. 8 is an enlarged fragmentary vertical section through the front axle and one of the guide and stop blocks. Fig. 9 is an enlarged fragmentary face view of the fender body and its housing and the bumper bar, particularly illustrating the link connections between the extremities of the lazy tong members. Fig. 10 is a detail perspective view showing a portion of the connections for manually tripping the fender. Fig. 11 is a detail plan view taken above the front axle, showing a portion of the fender raising connections.

Referring to the drawings A conventionally designates the forward portion of an automobile comprising the usual side frame bars 1, front springs 2, front axle 3, front steering wheels 4, body 5, engine covering hood 6, radiator 7, front mud guards 8 and head lamps 9, all of the parts just referred to being of the ordinary construction and arrangement in accordance with the present day automobile practice.

In carrying out the present invention, I employ a pair of supporting members 10 each of which is of a general arcuate shape and secured to the forward end portion of one of the frame bars 1 by means of bolts or clips 11. The forward portion of each supporting member 10 is bifurcated as shown in Fig. 7 to comprise two branches 12 which straddle the forward extremity of the adjacent frame bar 1 and the spring 2 and are formed with holes 13 to receive the shackle bolt 14 by which the bar 1 and spring 2 are usually fastened together.

The supporting members 10 are provided with forwardly projecting guide rods 15 upon which are slidingly mounted fender supporting arms 16. Each of said arms 16 is provided with eyes 17 and 18 which receive the adjacent guide rod 15 so as to permit the supporting arm to slide on said guide rod in a fore and aft direction. A cushioning spring 19 is interposed between the forward eye 18 and a collar 20 fast on the rod 15 in front of the rear eye 17. The spring 19 acts to hold the fender supporting arm 15 at the forward limit of its movement where it is stopped by means of a shoulder 21 on the forward extremity of the rod 15, the said shoulder 21 being shown in the form of a nut threaded on the extremity of the rod 15. Each guide rod 15 is also provided with a stop shoulder 22 against which the rear eye 17 strikes to limit the rearward movement of the fender supporting arm when the bumper bar hereinafter referred to strikes against a person or object.

The fender body comprises a top horizontal bar 23 and a bottom horizontal bar 24, the top bar 23 being secured by means of clips 25 to the under side of the top portion of a housing 26 which is substantially L-shaped as shown in Fig. 5, said housing being secured fixedly to the fender supporting arms 16, the forward end portions 27 of which extend downwardly in front of the housing 26 to brace and reinforce the same. The clips 25 which embrace the top horizontal bar 23 of the fender body are riveted, bolted or otherwise fastened to the housing 26 as shown at 28. A protecting apron 29 of metal or other material extends downwardly from the housing 26 as shown in Fig. 5 and is fastened along its upper edge thereto as shown at 30.

By reference particularly to Fig. 1, taken in conjunction with Fig. 9, it will be observed that the body of the fender comprises in addition to the top and bottom bars 23 and 24, a series of lazy tong bars or members 31 which intersect or cross each other at various points where they are pivotally connected together at 32, 33 and 34. The upper lazy tong members are pivotally connected at 35 to the central clip 25 hereinabove referred to while at the upper opposite corners of the fender body, the lazy tong members are pivotally connected at 36 to other clips 25' which are slidable longitudinally of the top horizontal bar 23. End links 37 and 38 are pivotally connected together at 39, one of said links being pivotally connected at the point 36 to the clip 25' and the other link 38 being pivotally connected at 40 to certain pivotally connected ends of the lazy tong members. One link 38 is extended beyond the pivot 39 and provided with a stop or projection 41 while the other link 37 is provided with a notch 42 which receives the projection 41 and prevents the two links 37 and 38 from reaching a position in longitudinal alinement with each other, this being done in order to permit the joints between the several sets of links to break inwardly in order to permit the fender to be collapsed and raised to its inoperative position. Sets of these links 37 and 38 extend along both ends of the fender body from the top bar 23 to the bottom bar 24 and serve to complete an efficient and substantially rectangular fender body which will pick up persons and prevent them from being struck by the wheels, frame or other parts of the automobile. The lower links 38 as well as the lower lazy tong members are connected pivotally at 43 to clips 44 which are slidable longitudinally of the bottom fender bar 24, this being necessary to admit of the collapsing of the fender body. Rollers 45 surround the bottom bar 24 to contact with the ground and prevent injury to the fender.

The bottom bar 24 of the fender when in its collapsed and raised position is supported by means of a plurality of catches 46 which are mounted on a common rock shaft 47 the ends of which are shown as required in Fig. 5 so as to cause both or all of the catches 46 to rock simultaneously when one of them is moved into or out of engagement with the bar 24. The shaft 47 is mounted to turn in supporting brackets 48 extending rearwardly from the housing 26.

A bumper bar 49 extends horizontally in front of the housing 26 and has connected thereto plungers 50 which extend through guide bushings 51 inserted through openings in the housing 26, each bushing 51 being threaded to receive clamping nuts 52 and 53 arranged respectively behind and in front of the housing 26 and being screwed tightly against the opposite faces of said housing as shown in Fig. 5. The plungers 50 are pivotally connected at 53' to the upper arms of the catches 46 and coiled expansion buffer springs 54 are interposed between the bumper bar 49 and the housing 26 or the bushings 51, the springs 54 serving to hold the bumper bar 49 at the forward limit of its movement and also to hold the catches 46 under the bottom bar 24 of the collapsible fender body all as clearly shown in Fig. 5. Stops or buffers 55 are carried by the housing 26, projecting forwardly therefrom and serving to arrest the rearward movement of the bumper bar 49 in time to prevent the same from being bent or injured. The fender is also adapted to be tripped and dropped by manually controlled means as shown in Figs. 2, 5 and 10 by means of a pedal 56 arranged conveniently for the operator, a connection 57 extending from the pedal 56 to one arm 58 of a rock shaft 59 which is mounted in bearings 60 on the axle 3. From another arm 61 on the shaft 59, a tripping connection 62 leads forward to one of the catches 46, said connection being fastened to the upper arm of the catch as shown at 63. Therefore, the operator by pressing on the pedal 56 may rock the shaft 47 and the catches 46 thereon outwardly from beneath the bottom fender bar 24, whereupon the fender will drop and be automatically extended to the position shown in Fig. 1. When the fender is in its lowered or operative position as shown, for example, in Fig. 3, it is sustained by means of braces 64 in the form of straight bars or rods the lower ends of which are connected at 65 to clips 66 which surround the bottom bar 24 as best shown in Fig. 9. Two of these braces 64 are preferably employed and as shown in Fig. 8 each of said braces has its upper end portion inserted through a slot 67 in a guide and stop block 68 fastened in fixed relation to the axle 3 by means of bolts 69, a tie plate 70 and nuts 71. Each brace 64 is provided with a plurality of shoulders 72 while another shoulder 73 is formed within the slot 67 of the block 68. The slot 67 is of such shape, being flared at both ends, that it will admit of the necessary sliding and swinging action of the brace 64. When the fender is raised, the braces 64 assume an approximately horizontal position as shown in Fig. 2. When the fender is dropped, the braces assume the inclined position shown in Fig. 3. In changing from one position to another, the braces 64 both slide and swing and when the fender is in its dropped position, the shoulders of the braces engage the shoulders 73 of the blocks 68 thereby sustaining the fender body in its operative position. Several shoulders 72 are provided on each brace 64 in order that the braces will act as such even though the fender has not completed its expanding movement before the object comes in contact therewith. Ordinarily, however, the person or object struck by the bumper bar 49 is tossed or propelled a sufficient distance in advance of the machine to enable the body of the fender to assume its fully operative position before such person or object comes in contact therewith.

The means for restoring the fender to its housed or inoperative position embodies a lifting chain 74 provided at its rear end with a suitable hand grip 75 within reach of the driver. The chain 74 extends downwardly through a tubular guide 76 in the floor of the vehicle and between upper and lower rollers 77 and 78 journaled on or in a supporting bracket 79 under the car floor. The chain 74 extends forwardly through a housing tube 80 the rear end of which is supported by the member 79 and the forward end of which is supported by suitable means connecting it with the front axle 3. At a suitable point the chain 74 is provided with branches 81 and 82 leading around centrally arranged pulleys 83 and extending in opposite directions therefrom around other pulleys 84, the pulleys 83 and 84 being connected to the axle 3. The branches of the chain then extend forwardly through other housing tubes 85 and over pulleys 86 on the under side of the fender supporting arms 16 and thence downwardly where they are fastened at their extremities to the bottom bar 24 of the fender body. Short trip chains 87 extend from the braces 64 to the branches 81 and 82 of the lifting chain so that in the preliminary pull on the handle 75, the trip chains 87 operate to slightly lift the braces 64 and move the shoulders thereof out of engagement with the shoulders 73 of the blocks 68. Then in a further pull on the handle 75, the branches of the chain lift the bottom fender bar 24 until the body of the fender is completely collapsed and restored to the position shown in Figs. 2 and 5 whereupon the bar 24 temporarily thrusts aside the engaging portions of the catches 46, the latter thereafter snapping under the bottom bar 24 and sustaining the fender body in its housed and inoperative position. Springs 89 may be connected to the blocks 68 to quickly depress the braces 64 when the fender is tripped. Bolts 90 or their equivalent fasten the housing 26 to the fender supporting arms 16.

Having thus described my invention, I claim:—

1. In a fender for automobiles, supporting members fastened to the forward ends of the side frame bars of the vehicle, guide rods extending forwardly from said members, a collapsible and folding fender body comprising horizontal top and bottom bars movable toward and away from each other, supporting arms carrying the top fender bar and slidable on said guide rods in a fore and aft direction, braces attached at their forward extremities to the bottom bar of the fender and extending rearwardly therefrom, and guide and stop blocks on the axle relatively to which said braces are slidable and adapted to swing.

2. In a fender for automobiles, supporting members fastened to the forward ends of the side frame bars of the vehicle, guide rods extending forwardly from said members, a collapsible and folding lazy-tong fender body comprising horizontal top and bottom bars movable toward and away from each other, supporting arms carrying the top fender bar and slidable on said guide rods in a fore and aft direction, braces attached at their forward extremities to the bottom bar of the fender and extending rearwardly therefrom, and guide and stop blocks on the axle relatively to which said braces are slidable and adapted to swing.

3. In a fender for automobiles, supporting members fastened to the forward ends of the side frame bars of the vehicle, guide rods extending forwardly from said members, a collapsible and folding fender body comprising horizontal top and bottom bars movable toward and away from each other, supporting arms carrying the top fender bar and slidable on said guide rods in a fore and aft direction, a housing carried by said fender supporting arms and adapted to conceal the fender body when collapsed, braces attached at their forward extremities to the bottom bar of the fender and extending rearwardly therefrom, and guide and stop blocks on the axle relatively to which said braces are slidable and adapted to swing.

4. In a fender for automobiles, supporting members fastened to the forward ends of the side frame bars of the vehicle, guide rods extending forwardly from said members, a collapsible and folding fender body comprising horizontal top and bottom bars movable toward and away from each other, supporting arms carrying the top fender bar and slidable on said guide rods in a fore and aft direction, braces attached at their forward extremities to the bottom bar of the fender and extending rearwardly therefrom, guide and stop blocks on the axle relatively to which said braces are slidable and adapted to swing, a spring sustained bumper bar arranged in front of said fender supporting arms, and fender upholding catches arranged to be actuated by said bumper bar to release the fender body.

5. In a fender for automobiles, supporting members fastened to the forward ends of the side frame bars of the vehicle, guide rods extending forwardly from said members, a collapsible and folding fender body comprising horizontal top and bottom bars movable toward and away from each other, supporting arms carrying the top fender bar and slidable on said guide rods in a fore and aft direction, braces attached at their forward extremities to the bottom bar of the fender and extending rearwardly therefrom, guide and stop blocks on the axle relatively to which said braces are slidable and adapted to swing, a spring sustained bumper bar arranged in front of said fender supporting arms, fender upholding catches arranged to be actuated by said bumper bar to release the fender body, and manually controlled means for operating said catches from the driver's seat.

6. In a fender for automobiles, supporting members fastened to the forward ends of the side frame bars of the vehicle, guide rods extending forwardly from said members, a collapsible and folding fender body comprising horizontal top and bottom bars movable toward and away from each other, supporting arms carrying the top fender bar and slidable on said guide rods in a fore and aft direction, braces attached at their forward extremities to the bottom bar of the fender and extending rearwardly therefrom, guide and stop blocks on the axle relatively to which said braces are slidable and adapted to swing, manually controlled means for tripping said braces and raising the bottom bar of the fender body, and catches for upholding the latter when raised.

7. In a fender for automobiles, supporting members fastened to the forward ends of the side frame bars of the vehicle, guide rods extending forwardly from said members, a collapsible and folding fender body comprising horizontal top and bottom bars movable toward and away from each other, supporting arms carrying the top fender bar and slidable on said guide rods in a fore and aft direction, cushioning springs for said arms, braces attached at their forward extremities to the bottom bar of the fender and extending rearwardly therefrom, and guide and stop blocks on the axle relatively to which said braces are slidable and adapted to swing.

8. In a fender for automobiles, supporting members fastened to the forward ends of the side frame bars of the vehicle, guide rods extending forwardly from said members, a collapsible and folding fender body comprising horizontal top and bottom bars movable toward and away from each other, supporting arms carrying the top fender bar and slidable on said guide rods in a fore and aft direction, braces attached at their forward extremities to the bottom bar of the fender and extending rearwardly therefrom, guide and stop blocks on the axle relatively to which said braces are slidable and adapted to swing, each of said blocks embodying a guide slot for the respective brace, and a stop shoulder, and the brace having a shoulder movable into and out of engagement with the shoulder on the block in the sliding and swinging movement of the brace.

In testimony whereof I affix my signature in presence of two witnesses.

CLYDE B. JUGLE.

Witnesses:
NELS PALMQUIST,
WALLACE A. KEEFE.

Copies of this patent may be obtained for five cents each, by addressing the "Commissioner of Patents, Washington, D. C."